(12) United States Patent
Kamen et al.

(10) Patent No.: US 6,452,594 B1
(45) Date of Patent: Sep. 17, 2002

(54) METHOD AND APPARATUS FOR USING A 3D GRAPHICS PIPELINE AND 3D IMAGING FOR COST EFFECTIVE WATERMARKING

(75) Inventors: Yakov Kamen, Cupertino; Leon Shirman, Redwood City, both of CA (US)

(73) Assignee: isurfTV, Sunnyvale, CA (US)

( * ) Notice: Subject to any disclaimer, the term of this patent is extended or adjusted under 35 U.S.C. 154(b) by 0 days.

(21) Appl. No.: 09/398,568

(22) Filed: Sep. 16, 1999

Related U.S. Application Data

(63) Continuation-in-part of application No. 09/361,470, filed on Jul. 27, 1999.

(51) Int. Cl.$^7$ ............................................. G06T 15/60
(52) U.S. Cl. ........................ 345/426; 345/427; 345/629; 345/506; 382/154
(58) Field of Search ................................. 345/426, 582, 345/427, 629, 505, 506; 382/300, 293, 154

(56) References Cited

U.S. PATENT DOCUMENTS

| | | | | |
|---|---|---|---|---|
| 6,016,150 A | * | 1/2000 | Lengyel et al. | .............. 345/426 |
| 6,097,394 A | * | 8/2000 | Levoy et al. | ................ 345/419 |
| 6,246,778 B1 | * | 6/2001 | Moore | ......................... 382/103 |

* cited by examiner

*Primary Examiner*—Mark Zimmerman
*Assistant Examiner*—Kimbinh T. Nguyen

(57) ABSTRACT

A pixel array of an image and a computer model of a geometric surface are embedded within a piece of software. An image is rendered using the pixel array and the computer model of the geometry using a 3D graphics pipeline. A special virtual lighting source is used by the pipeline to provide virtual illumination of the image. This is done as part of a process of verifying the authenticity of the software.

31 Claims, 7 Drawing Sheets

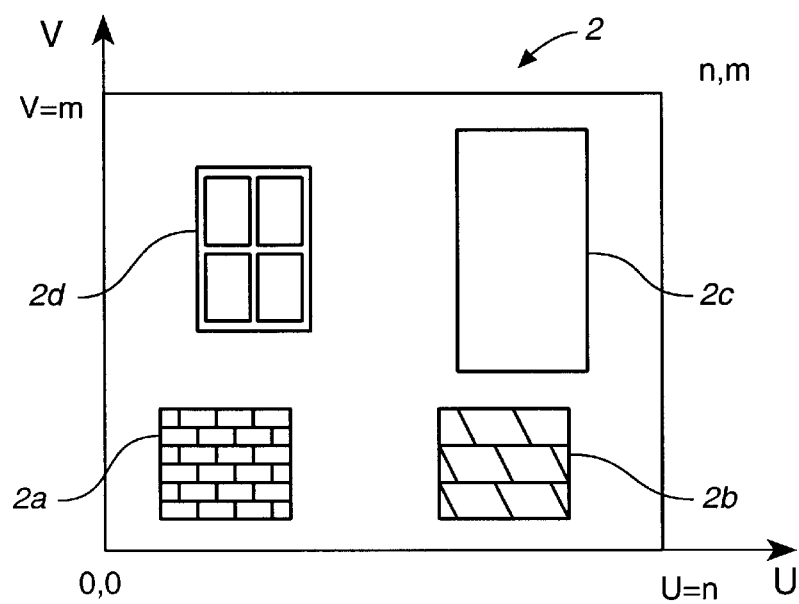
FIG._1A
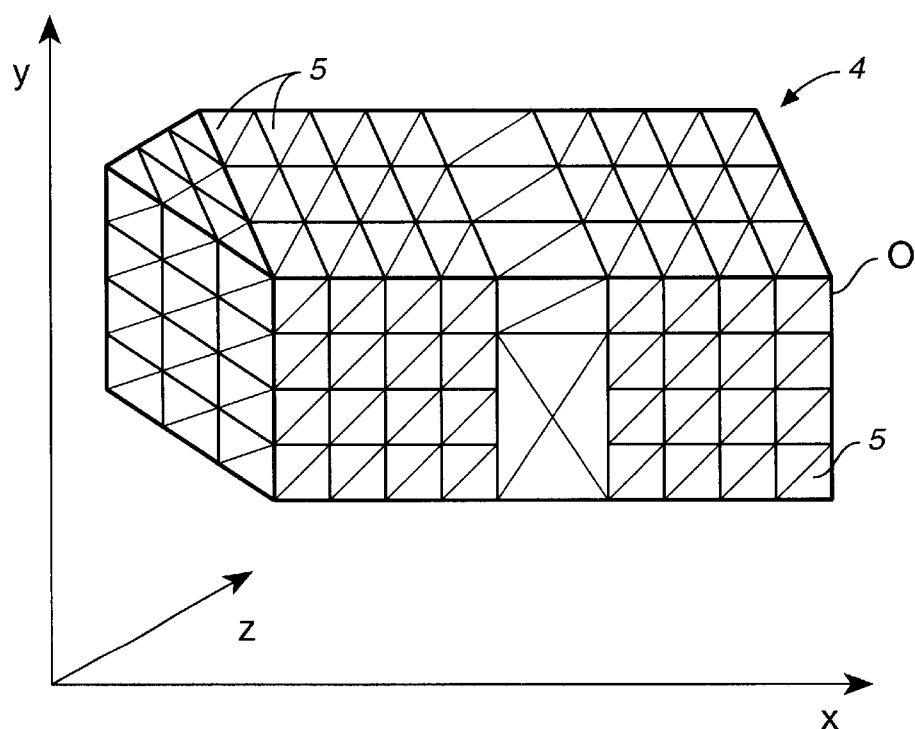
FIG._1B

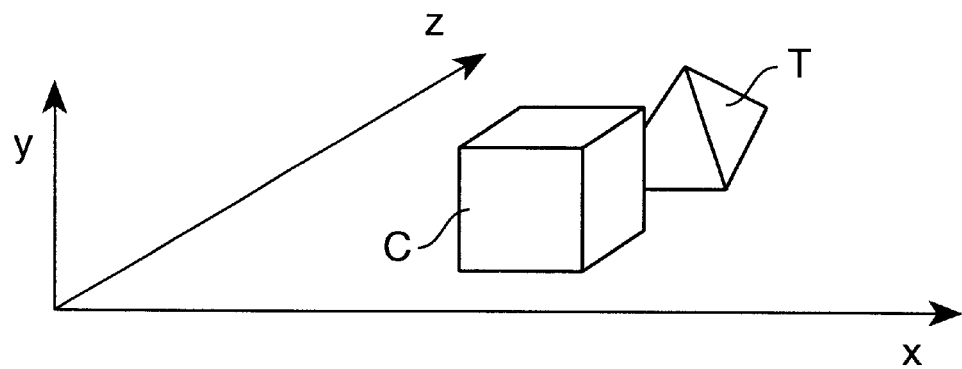
FIG._1C
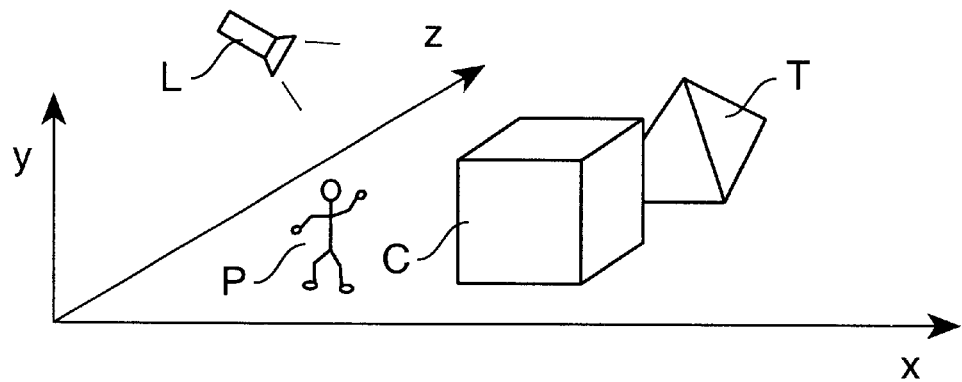
FIG._1D
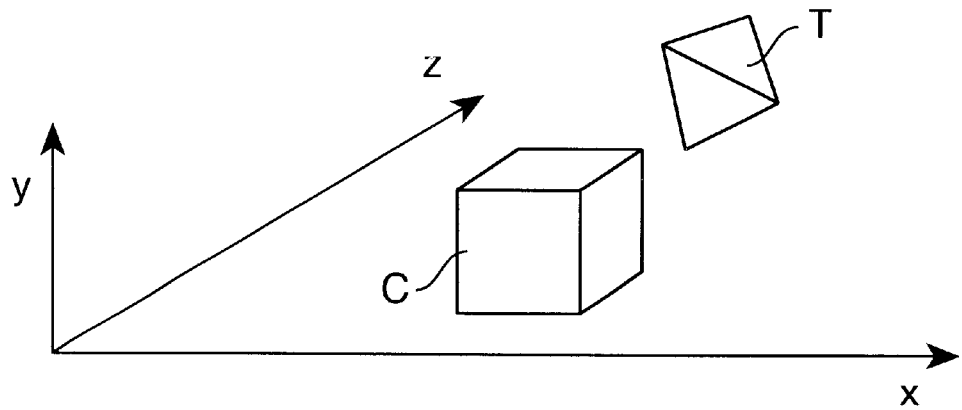
FIG._1E

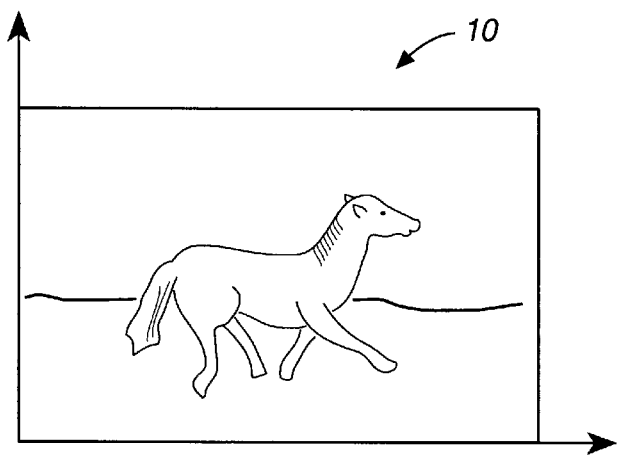
FIG._2A
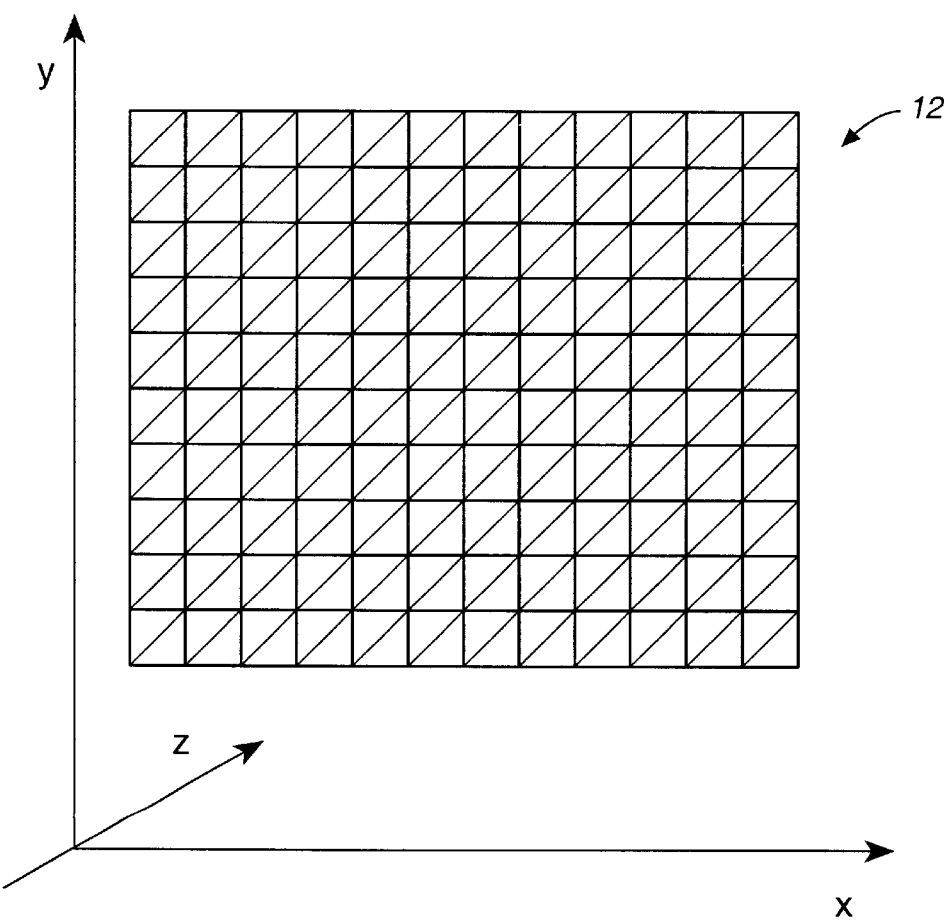
FIG._2B

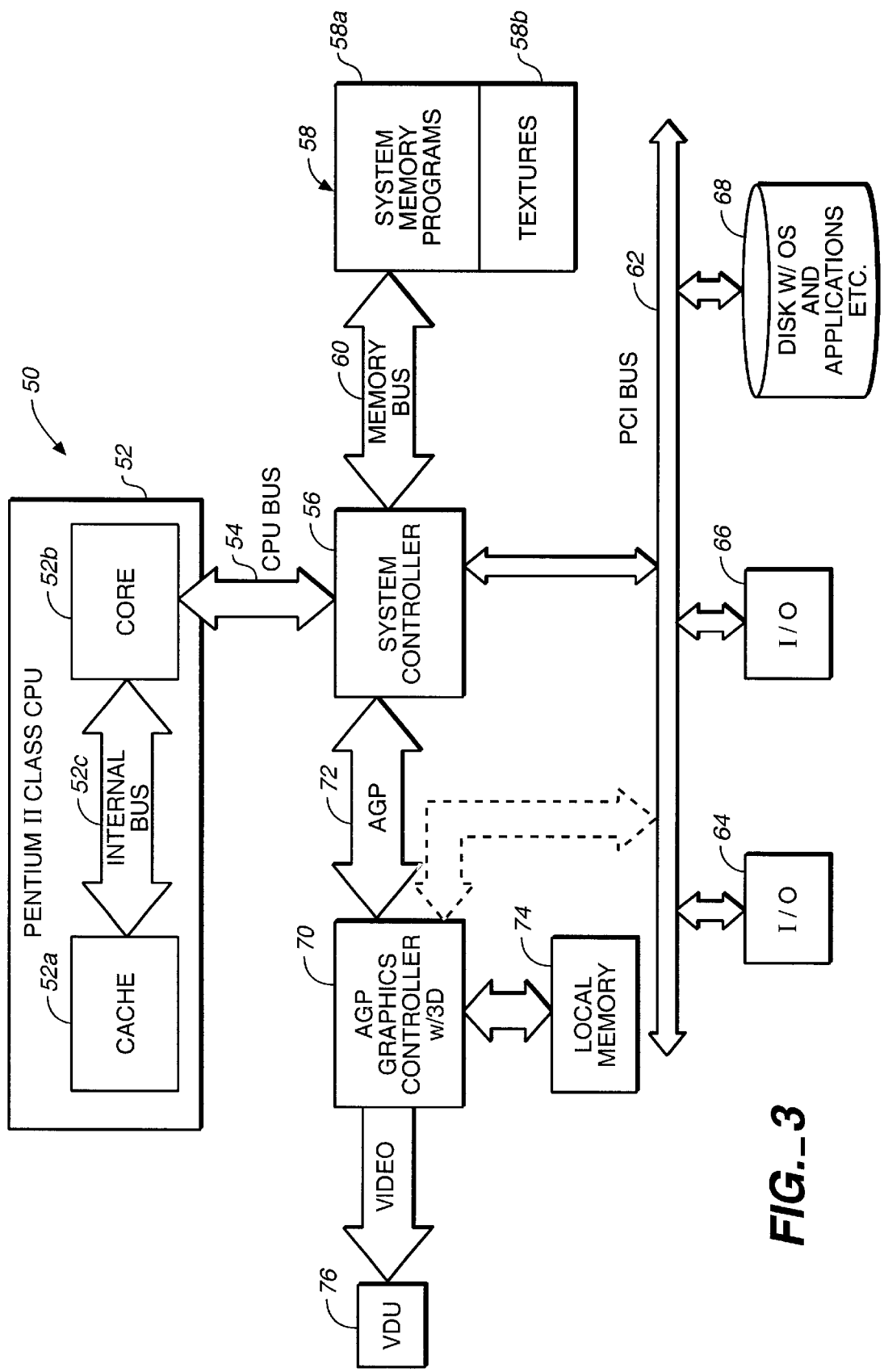
FIG._3

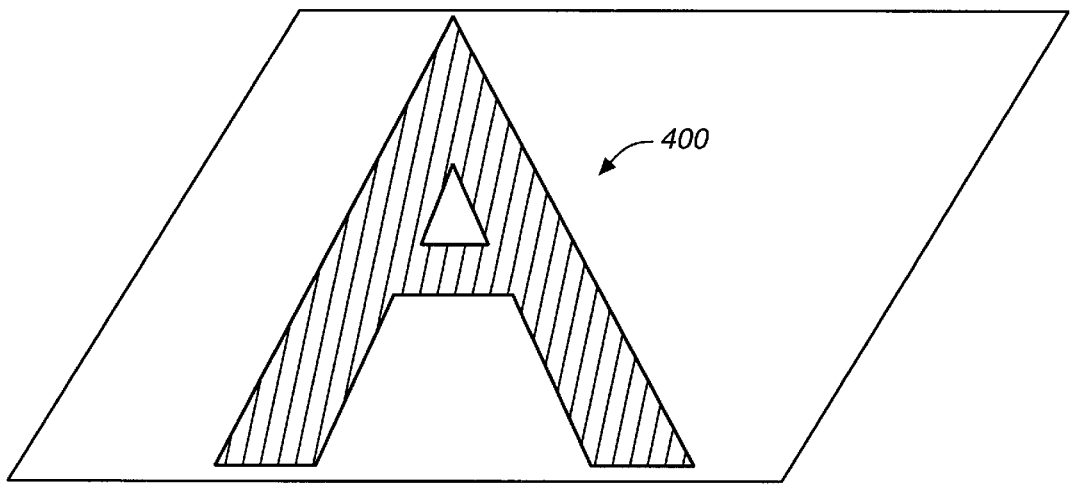
FIG._4A
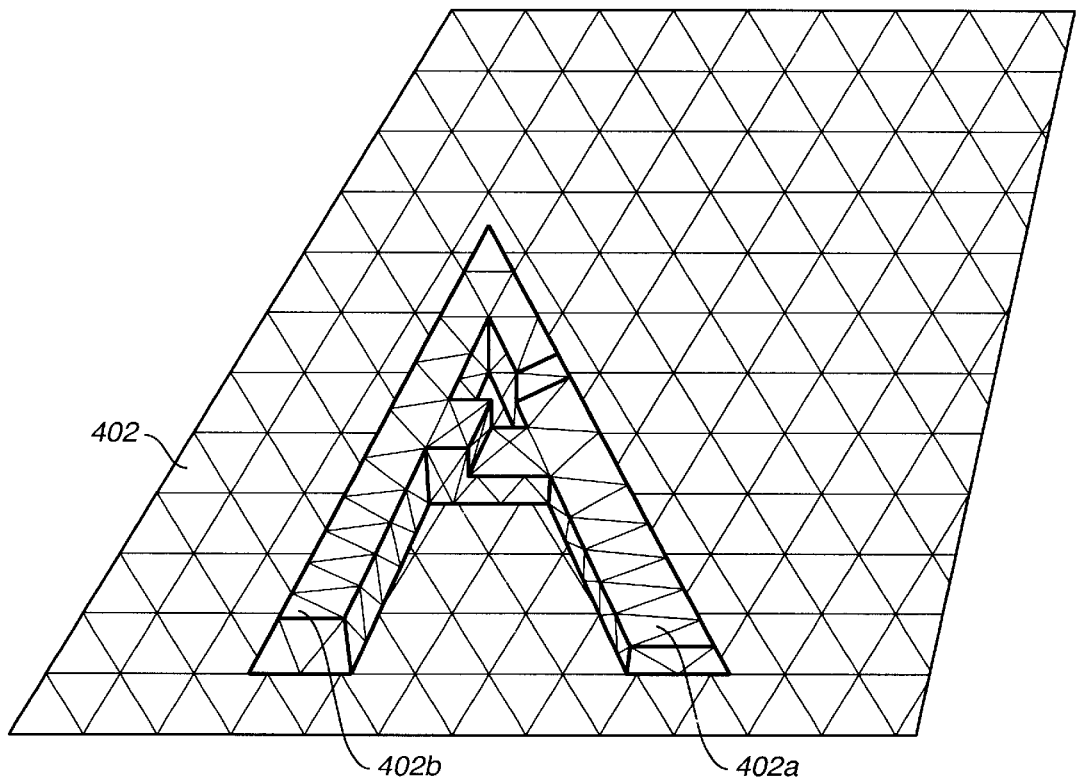
FIG._4B

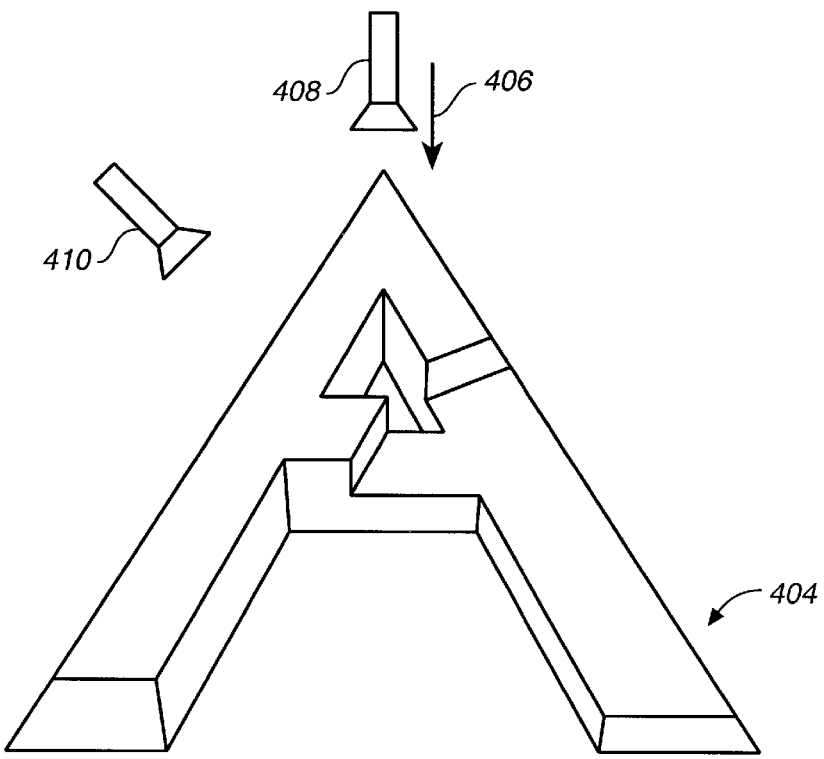
FIG._4C
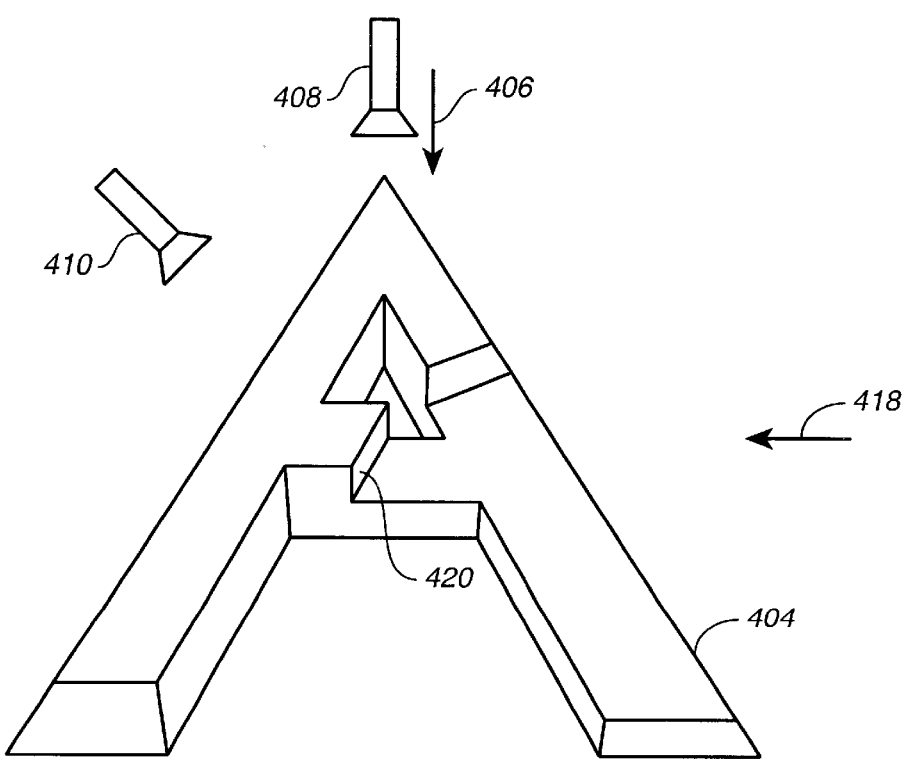
FIG._5

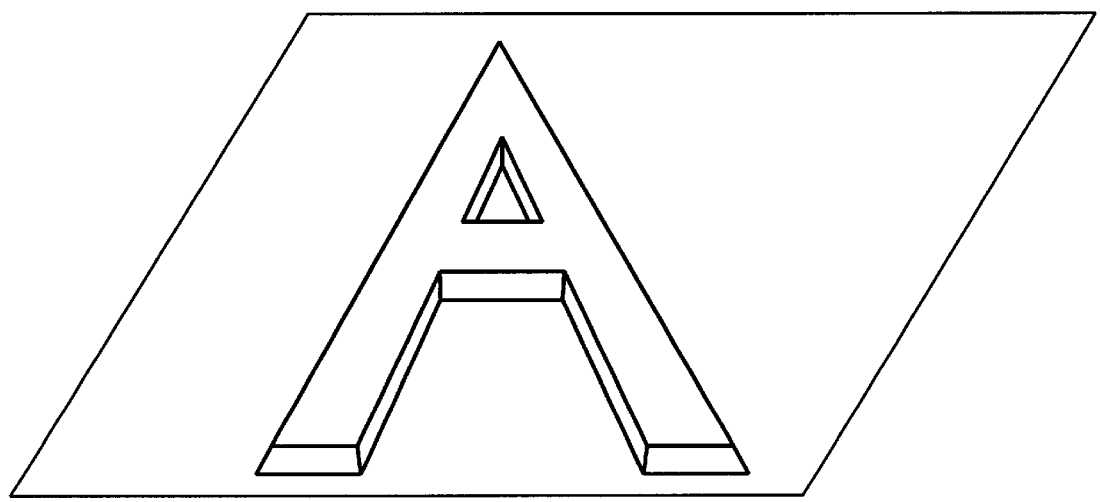
FIG._6A
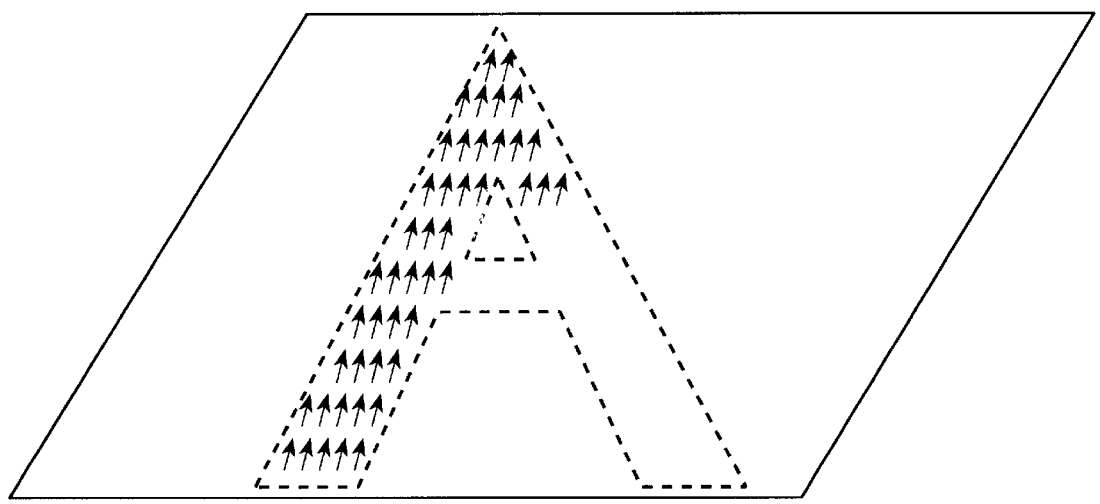
FIG._6B

METHOD AND APPARATUS FOR USING A 3D GRAPHICS PIPELINE AND 3D IMAGING FOR COST EFFECTIVE WATERMARKING

This patent is a continuation in part of U.S. patent application Ser. No. 09/361,470, filed Jul. 7, 1999, incorporated herein by reference.

BACKGROUND

Watermarking a software or data product is an important process, in particular to protect its copyright. Verifying an electronic watermark is also important, since counterfeiters are very inventive in copying software authenticity verification tools. It often requires analysis and a long time to determine whether a software or data product is legitimate or counterfeit. This determination can be very expensive. A method and apparatus is needed by which such a software or data product, here an image or a video stream, can be easily tested for authenticity.

This invention pertains to 3D watermarking using 3D object construction. This invention also pertains to integrated texture mapping, filtering and image geometry displacement.

It is known in the art to computer generate 3D objects, texture them, and project them as a sequence of images on a screen. One way of doing this is with a conventional 3D graphics pipeline. Briefly, a conventional 3D graphics pipeline creates an image by performing the following tasks:

1. A computer model of a geometric surface is created or provided. The computer model can be an array of polygons, described in the computer model in terms of the x, y and z coordinates of its vertices. The polygons are joined together at their edges to form a 3D surface. Alternatively, the computer model can be a set of geometric surfaces that are defined in other ways, e.g. "implicitly defined," using mathematical equations.
2. A pixel array (or arrays) containing one or more images to be applied to the polygons (or implicitly defined geometric surfaces) as textures is provided. We will refer to this type of pixel array as a "texel" array. We will refer to the individual pixels within the texel array as texels.
3. The texel array is "bound" to the polygons or surfaces. In other words, each polygon is associated with a portion of the texel array that contains a description of the appearance (e.g. color, brightness, saturation, a pattern of colors, etc.) that that polygon will exhibit.
4. A 3D graphics pipeline then uses the texel array and computer model of the surface to generate an image. This image is provided as another pixel array that is displayed on a computer monitor or other output device.

While the above-mentioned process is adequate for some purposes, this process is has some shortcomings when one tries to apply certain textures to the computer model of the surface. For example, assume that instead of applying a simple texture contained in a texel array to an object, one tries to apply a pixel array that is a photograph of an object (e.g. a book on a table). The book is, of course, a three-dimensional object. If one simply uses a 3D graphics pipeline to apply such a pixel array to the computer model of the surface, the result will be a surface having a 2D image of a book thereon. In other words, the 3D characteristics of the book will be lost.

Our U.S. patent application Ser. No. 09/361,470 teaches a method for modifying the model of the geometric surface in order to preserve the 3D characteristics of 3D objects depicted in a 2D pixel array when applying the pixel array to a computer model of a geometric surface. This results in the construction of more realistic images to be displayed on a CRT.

SUMMARY

A method in accordance with the invention comprises the step of authenticating an object by rendering an image of an electronic watermark. The electronic watermark comprises data corresponding to a first image and a geometric surface. (The first image can be in the form of a pixel or texel array.) The method comprises rendering an image on a display corresponding to the pixel or texel array and the geometric surface to authenticate the watermark. The image is typically rendered using a 3D graphics pipeline. In one embodiment, the image is rendered using a virtual light source that assists in determining whether the watermark is authentic. The geometry is typically applied to a surface, and the geometry is observed (rendered) from a perspective that is orthogonal to that surface (i.e. the geometry is rendered from the perspective of a virtual viewer whose line of site is at an angle of 90° with respect to the surface).

The virtual light source is specular (non-diffuse) and provides illumination from a selected angle. By rendering the image using this virtual light source, certain characteristics of the geometry, not otherwise apparent, become visible. Different points on the geometry become visible, and the appearance of these different points is used to authenticate the watermark.

In another embodiment, the image is rendered from a selected perspective. This perspective assists in determining whether the watermark is authentic. In particular, by observing the watermark from this perspective, certain characteristics of the geometry, not otherwise apparent, become visible.

In one embodiment, the electronic watermark is part of a larger collection of data, e.g. video images, still images, software, a data compilation, or other product.

In one embodiment, the electronic watermark is encrypted.

A system in accordance with the present invention comprises a display screen and means for receiving an electronic watermark. The electronic watermark comprises data corresponding to a first image and a geometric surface. The apparatus comprises means for rendering an image using the data corresponding to the first image and the geometric surface. In one embodiment, the means for rendering is a 3D graphics pipeline. The means for rendering renders the image using a virtual light source that assists in determining whether the image is authentic. In another embodiment, the means for rendering renders the image from the perspective of a virtual viewer. The perspective of the virtual viewer assists in determining whether the electronic watermark is authentic.

BRIEF DESCRIPTION OF THE DRAWINGS

FIGS. 1A to 1E illustrate the operation of a 3D graphics pipeline.

FIGS. 2A and 2B illustrate a 2D image to be bound to a geometry.

FIG. 3 is a simplified block diagram of a personal computer (PC) coupled to a graphics controller with a 3D graphics pipeline.

FIG. 4A shows an image to be used as part of an electronic watermark.

FIG. 4B shows a geometric surface to which the image of FIG. 4A is to be bound to generate an image of the electronic watermark.

FIG. 4C depicts a pseudo-isometric view of the object corresponding to the image of FIG. 4A bound to the geometric surface of FIG. 4B.

FIG. 5 illustrates the location of an alternative virtual viewer for rendering an image of the object of FIG. 4C.

FIG. 6A illustrates a geometric surface.

FIG. 6B illustrates a Z array used to offset the geometric surface of FIG. 6A.

DETAILED DESCRIPTION

As mentioned above, a method in accordance with our invention involves generating an image of a 3D object. A watermark is encoded into the geometry of that image. In one embodiment, the image is generated using a 3D graphics pipeline, incorporating a special technique for modifying the image. In particular, we modify a computer model of a geometric surface to offset portions of the surface in the Z direction as a function of information to be encoded in the image.

In order to better explain our invention, we will first explain how a 3D graphics pipeline is normally used. Thereafter, we will describe how one can use certain types of data to alter the geometry of an image. Finally, we will explain how one can use this method to create a geometry-encoded watermark in accordance with our invention.

3D Graphics Pipelines

The 3D graphics pipeline referred to in this patent is a conventional graphics pipeline well known in industry, e.g. as described in Foley, et al., "Computer Graphics—Principles and Practice", published by Addison Wesley in 1997, incorporated herein by reference. The graphics pipeline can be implemented by a combination of hardware elements, known as accelerators, and software, some of which is sometimes referred to as drivers. The partitioning between hardware and software may vary, depending upon the CPU used and the graphics card in the system, but the overall system performs the method described below. Portions of the pipeline tasks can be performed by software, which is less expensive than hardware, but in general slower than hardware solutions at the present time. The hardware and software that perform the method described below are referred to simply as a pipeline, without regard to the specific partitioning.

The following is a simplified, general description of 3D graphics pipelines. It is not intended to describe any specific product (e.g. products mentioned later in this patent). Rather, the following description is merely a general explanation of 3D graphics pipelines to assist the reader's understanding.

Currently, graphics objects created using a 3D graphics pipeline can be described as a set of geometric surfaces. One way of constructing a geometric surface in a graphics pipeline is to create a "mesh" of "primitives." A "primitive" is a small geometric surface that can be defined by a set of vertices. For example, the primitive can be a polygon (e.g. a triangle or quadrilateral) defined within the pipeline in terms of the locations (in x, y and z coordinate space) of its corners or vertices. A set of several primitives is used to define a larger 3D surface.

Instead of using primitives, such as polygons, some graphics pipelines can process geometric surface areas defined in other ways, e.g. by mathematical equations. This technique for defining geometric surface areas is called "implicit." As explained below, both techniques for defining such surface areas can be used to perform a method in accordance with our invention.

For purposes of clarity of explanation, we will first describe a graphics pipeline that processes geometric surface areas using triangular primitives. We will discuss other types of graphics pipelines later on.

In this first example, a 3D graphics pipeline constructs a 3D image of an object from a 2D texel array (typically called a "texture map"). FIG. 1A illustrates a 2D image 2 of a set of "textures." (As will be explained below, this texture map is used to create the image of an object—in this case, a house. Image 2 includes a portion 2a, which has the appearance of bricks, portion 2b, which has the appearance of roof shingles, portion 2c, which has the appearance of a door, and portion 2d which has the appearance of a window.) 2D image 2 is stored in a digital memory in the form of an array of texels. Each location in the memory stores a texel, which is one or more words of data indicating the color, color saturation and brightness corresponding to that texel. The location of the texels within the array is typically referred to as u, v coordinates (not to be confused with the Y, U and V signal names used to describe certain video signals). The u, v coordinates are similar to x, y coordinates of the Cartesian coordinate system. In FIG. 1A, the texel array is an n by m array, where n and m are integers.

As mentioned above, FIG. 1A represents a texel array. Physically, the array comprises data loaded into a memory.

The next step in the process is to provide or prepare a geometric surface. In this example, the geometric surface is in the form of a mesh 4 of primitives 5 in three dimensional space (FIG. 1B). In the case of FIG. 1B, the primitives are triangles, but other types of polygons can be used. The mesh of primitives represents a three-dimensional shape of an object O in 3D space (in the case of FIG. 1B, the shape of a house). The position of each vertex of each triangle within mesh 4 is stored in a memory in the form of x, y and z Cartesian coordinates, relative to the object. These coordinates are sometimes referred to as model coordinates ("MC"). The process of preparing such a mesh is well-known, and described in standard graphics libraries, such as Real 3D, published by Real 3D, a Lockheed Martin Corporation, in 1996, and Direct 3D, published by New Riders Publishing in 1997.

The mesh of FIG. 1B is not displayed as such. Rather, the mesh of FIG. 1B is a representation of what is stored in a digital memory. Specifically, the memory stores the locations, in terms of x, y and z coordinates, of each vertex within mesh 4.

The next step is to map or "bind" the two-dimensional texture map of FIG. 1A onto mesh 4 of FIG. 1B. This is accomplished by mapping each triangle vertex to a location in the texture map. In effect, a list of data points is prepared which associates each vertex of mesh 4 to the u, v coordinates of a particular point (texel) in the texture map of FIG. 1A. (The locations in the texture map to which the vertices are bound are sometimes referred to as "control points.")

This portion of the process is roughly analogous to an upholsterer choosing a piece of fabric, and binding it with a few nails to the corner of a couch being upholstered (the nails are like control points). The upholsterer subsequently asks his apprentice to finish attaching the fabric to the couch. In this case, the 3D graphics pipeline finishes the task instead of an apprentice.

FIGS. 1A and 1B describe the process by which one texture map (FIG. 1A) is mapped onto one mesh 4 representing one object O. A graphics pipeline can, and often does, map one or several texture maps onto the same or several different objects.

The next step in the process is to set up a "world coordinate model" of the various objects to be displayed. This requires establishing a position and directional orientation for each object to be displayed. For example, suppose that instead of a house there are to be two objects to be viewed: a tetrahedron T and a cube C (FIG. 1C). During this portion of the process the pipeline is instructed that cube C is to be facing in a certain direction, and is to be located partially in front of tetrahedron T relative to a certain frame of reference. Again, the structure of FIG. 1C is not displayed per se. Rather, the graphics pipeline sets up processing of the model coordinates in accordance with the parameters of the position and orientation of the object.

The next step is to select a frame of reference. For example, it might be decided that the "viewer" will want to observe the objects from a position corresponding to a corner of the world coordinate model (e.g. position P in FIG. 1D). Thus, a virtual viewpoint, viewing direction and aperture will be selected. The parameters associated with this "viewer" define the screen coordinate (SC) system. Further, it might be decided the viewer will observe these objects with a light source located at a position L. The graphics pipeline will set up another processing pipe to process the world coordinate data into the screen coordinate data which will cause a computer screen to display the image as it would be perceived by the observer at position P. In other words, the computer screen will provide an image of tetrahedron T and cube C as they would be observed by a viewer if he were standing at position P, and a light source were present at location L. This image will be provided initially as a pixel array in a frame buffer and then displayed by the computer screen. The image in the frame buffer is refreshed, i.e. regenerated according to the specifications programmed into the pipeline, typically at about 50 to 120 times per second. There are many different methods for optimizing the pipeline, and minimizing the time spent processing the invisible parts of the objects, such as the backside of cube C facing away from the viewer. Such details are well-known to those skilled in the art, and will not be discussed in detail here.

During the above-described process of constructing the pixel array and providing it in the frame buffer, the pipeline a) fetches the portion of texture map 2 "tacked" to the vertices of mesh 4 (and therefore stretched over each triangle); b) determines how and where that portion of the texture map should appear, given the orientation of the triangles relative to the viewer and the location of the light source; and c) constructs the appropriate bit map pixel array for storage in the frame buffer. The contents of this frame buffer are then displayed as an image on a computer screen.

Thereafter, the 3D graphics accelerator permits one to manipulate the displayed objects in any desired manner. For example, if one wants to rotate the image of tetrahedron T by 45° (FIG. 1E), the 3D graphics accelerator facilitates this manipulation. This is accomplished by providing a new set of parameters in the world coordinate model for the graphics pipeline indicating the new position and orientation for tetrahedron T. After this occurs, the next time the graphics pipeline regenerates the image stored in the frame buffer, the regenerated image will reflect this rotation of tetrahedron T.

Similarly, suppose that it is desired to display what would appear to the viewer if he took ten steps forward from his location at position P. The next time the graphics pipeline regenerates the image, it will generate and store another pixel array in the frame buffer corresponding to what would appear to such a viewer, and this pixel array is provided as another image on the computer screen.

It is thus seen that the graphics pipeline is extremely useful in applications such as video games, where it is desired to simulate what would appear to a game player if he were wandering past a set of objects.

As mentioned above, some graphics pipelines create models of geometric surfaces using an implicit technique. These surfaces are often described as a function of the position coordinates, i.e. $f(x,y,z)$, or can also contain some vertices. Control points and additional formulas associated with such surfaces are used to bind a digital texel array (e.g. an array as shown in FIG. 1A) to the implicitly defined surface, and the process proceeds as described above. The major difference is that instead of defining surface areas in terms of primitives with vertices, the surface areas are defined in terms of mathematical equations.

Using a 2D Image Instead of a Texel Array

Our earlier U.S. patent application Ser. No. 09/344,442 (incorporated herein by reference) discloses a method of applying a 2D image onto a geometric surface. A method in accordance with this application begins with the step of obtaining a two-dimensional digital image (e.g. image 10 in FIG. 2A). This step can be performed, e.g., by scanning an image such as a photograph or other picture using a conventional digital scanner. The digital image can also be obtained from a conventional digital camera. The image can also be digital video image, e.g. from a live or stored video stream, which is basically a fast succession of 2D images. However, any other source of a 2D digital image can be used. As mentioned above, the digital image is typically stored in a memory as an array of digital values. In one embodiment, the digital values are in a compressed form, e.g. using a compression technique such as MPEG1 or MPEG2 or other formats. In the case of compressed digital values, they must first be decompressed prior to processing. Also, scanned images or digitized images from any source such as cable TV, antennas, cameras, etc. can be used.

As mentioned above, for the case of video images, dozens of frames per second comprising millions of pixels per second must be processed. Standard graphics pipelines can be used to process frames of data sufficiently fast to process video images.

Any type of memory can be used to store the digital 2D image, e.g. semiconductor memories (SRAMs, DRAMs or other semiconductor memories), a magnetic memory (e.g. a hard disk, a floppy disk, magnetic tape, or magneto-optic disk), or other type of memory device (e.g. an optical disk). The pixels corresponding to the stored image can be stored in terms of RGB values (e.g. the strength of the red, green and blue components of the pixel color), YUV values or other values. (For YUV values, Y corresponds to the amplitude or brightness of the pixel value, U corresponds to the color and V corresponds to the saturation.) The pixel values can be encoded in other ways as well. Depending on the situation, a conversion may be required before further processing.

Next, a 3D graphics pipeline is set up. This is accomplished by providing instructions to the 3D graphics pipeline as to what is to be done with the data that is to be provided. Setting up graphics pipelines per se is well known in the art, e.g. as described in the Microsoft Direct 3D SDK (software developer kit) or Direct 3D.

Thereafter, a computer model of a planar geometric surface is generated. This computer model can comprise a set of primitives, e.g. polygons such as triangles. In another embodiment, the computer model can comprise an implicit description of a flat geometric surface. This implicit description is typically a mathematical function (e.g. a function of x, y and z) as described above.

For the case in which the planar geometric surface comprises a mesh of primitives, the number and shape of primitives and the type of primitives can vary. FIG. 2B illustrates a mesh 12 that can be used to practice a method in accordance with the '442 invention. Mesh 12 is similar to mesh 4 described above. However, unlike mesh 4, all of the vertices of mesh 12 are coplanar (or substantially coplanar). In one embodiment of the '442 invention, mesh 12 comprises about 5000 triangles, which would be acceptable for processing a video image. Of course, other numbers of primitives could be used.

After constructing the planar geometric surface (e.g. mesh 12), image 10 is mapped, or bound, onto the flat geometric surface. This is accomplished in the following way. For the case in which the flat geometric surface is a mesh such as mesh 12, each vertex of the flat geometric surface (e.g. the triangle vertices) is associated with an image pixel location (i.e. control point). Thus, each control point is associated with a texture coordinates (u, v) corresponding to a pixel. This is called "binding". In one embodiment, a table of data listing each vertex and its associated u, v texture space coordinates is set up. (See Kamen, IEEE Computer Society, IEEE Computer Graphics and Applications, Jan.-Feb. 1997, Vol. 17, No. 1.) For the case in which an implicit technique is used to define the flat geometric surface, control points within the implicitly defined surface are bound to pixel array coordinate space (u, V coordinates) in a manner analogous to the triangles discussed above.

Creating an Electronic Watermark

In the present invention, an image or video stream is bound to a geometric surface as described in our co-pending U.S. patent application Ser. No. 09/361,470. However in one embodiment we establish the Z coordinates of the geometric surface in accordance with a pattern that serves as part of a watermark for ensuring authenticity. FIG. 4A illustrates an image 400 (the letter "A") that is used to construct a watermark. (Clearly, any alphanumeric character, text, logo, or other symbol or object could be substituted.) FIG. 4B schematically illustrates a modified geometric surface 402 to which image 400 is to be bound. As can be seen, geometric surface 402 comprises a first portion 402a having a relatively low surface elevation and a second portion 402b having a relatively high surface elevation. (This geometry is merely exemplary, used to illustrate the present invention. Other types of geometric surfaces could be used.) FIG. 4C illustrates the resulting object 404 corresponding to image 400 bound to geometric surface 402. Object 404 is used as an electronic watermark for verifying the authenticity of a data or software product. Typically, image 400 and geometric surface 402 are inserted into a larger image, video stream, software program, or collection of data values.

During normal viewing, a 3D graphics pipeline renders an image of the object 404 from the perspective of a virtual viewer. This virtual viewer observes the object from a direction perpendicular to the main plane of the image, e.g. as shown by arrow 406. Normally, the 3D graphics pipeline renders the image as illuminated by a virtual light source 408 located directly adjacent to the virtual viewer.

In order to determine whether the watermark is genuine, the 3D graphics pipeline renders the image using a second virtual light source 410, which illuminates object 404. The direction of light from second virtual light source 410 is symbolized by arrow 412. In other words, a 3D graphics pipeline renders a version of the image using second virtual light source 410 instead of virtual light source 408. The resulting rendered image includes shadowing caused by the position of second virtual light source 410. This shadowing can be seen, and will serve to indicate that the watermark is genuine. Once the verification is completed, second virtual light source 410 is "removed", and the image is rendered again using virtual light source 408.

In one embodiment, by viewing the image using virtual light source 410, one can see portions of the image that would otherwise be obscured by shadows. The appearance of these portions can also be used to authenticate the image.

In yet another embodiment, by viewing the image using virtual light source 410, portions of the image that would otherwise be visible are obscured by shadows. The obscuring of these portions can be used to authenticate the image.

In an alternative embodiment, instead of using second virtual light source 410 to verify authenticity of the watermark, in another embodiment, a second virtual viewer is used by the 3D graphics pipeline to render an image of object 404, e.g. a virtual viewer looking at object 404 from a direction 418 (see FIG. 5). When rendered from the perspective of direction 418, certain features that would not otherwise be apparent in the image (e.g. surface 420) will become apparent, so that a person observing the rendered image will be able to ascertain its authenticity. For example, a pattern or lettering on surface 420 can be used to authenticate the image.

In yet another embodiment, a given surface is eclipsed by other structures or obscured when the image is rendered from the perspective of direction 418. The fact that this surface is not visible when the image is rendered is used to authenticate the image.

In yet another embodiment, both a second virtual light source and a second virtual viewer are used to render the image and verify watermark authenticity.

In one embodiment, the electronic watermark is provided in a larger collection of data in an encrypted form. A person seeking to authenticate the watermark must have the key to decrypt the data. The encryption/decryption program can be stored in memory 58 (or disk drive 68), described below.

The location of the first and second virtual light sources (or first and second virtual viewers) can be stored in memory 58 (or disk drive 68), either in encrypted or non-encrypted form. In another embodiment, the location of the second virtual light source (or the second virtual viewer) is provided to the computer system by a user seeking to authenticate the watermark. The software within the computer system provides this location information to the 3D graphics pipeline, which then renders the image of the electronic watermark as appropriate.

In another embodiment, the person seeking to authenticate the watermark uses a special workstation or computer having a memory which stores the location of the watermark image, and the location of the second virtual light source or viewer. This person will load the data, video stream, software, or other object to be authenticated, locate the watermark, and instruct the 3D graphics pipeline to use the second virtual light source or virtual viewer. The image rendered by the graphics pipeline is visually observed to check for watermark authenticity.

In another embodiment, the authenticity of the watermark can be verified on a conventional graphics pipeline-equipped workstation, if one knows the location of the watermark and what to look for.

As mentioned above, the watermark contains a geometric surface adapted to facilitate authenticity determinations. In one embodiment, the geometric surface initially has a first shape (as shown in FIG. 6A), and is modified in accordance with "Z array information" from elsewhere in the data stream. For example, the Z array can be an array of data (in terms of x and y coordinates) containing offset values. These offset values are schematically shown as a set of vectors (depicted as arrows) in FIG. 6B. Each arrow depicts a non-zero location of the Z array. In this embodiment, prior to binding the image of FIG. 4A to the geometric surface of FIG. 4B, the Z array is bound to the geometric surfaced of FIG. 6A, and used to modify the geometric surface of FIG. 6A so that it becomes the geometric surface of FIG. 4B. In other words, the offset values stored in the Z array are used to modify the vertex coordinates corresponding to the geometric surface so that the geometric surface has the appearance of FIG. 4B. Thereafter, the pixel array of FIG. 4A is bound to the geometric surface of FIG. 4B, and an image is rendered as described above.

In another embodiment, the watermark geometric information is not modified in accordance with Z array information from elsewhere in the data stream. Instead, the watermark geometric information is initially as depicted in FIG. 4B.

HARDWARE AND SOFTWARE FOR PRACTICING AN EMBODIMENT OF A METHOD IN ACCORDANCE WITH OUR INVENTION

One embodiment of our invention can be practiced using a PC having the following:

1. A CPU such as a Celeron or Pentium, e.g. as manufactured by Intel, or a K6 processor, e.g. as manufactured by Advanced Micro Devices.
2. 32 MB of memory or greater.
3. A 3D HW adapter. This is a type of graphics card currently available on the market. The 3D HW adapter should have 4 MB of memory (preferably 8 MB) and an advanced graphics port (AGP) interface. (An AGP interface is a type of bus standard that is well-known in the art.) Alternatively, a peripheral connection interface ("PCI") can be used in lieu of a AGP. The PCI is a type of bus standard that is well known in the art. Examples of appropriate 3D HW adapters include the TNT-2 available from Riva, the ATI Rage 128, the Matrox G400, the Trident Blade 3D and the S3 Savage.
4. The operating system can be Windows 95, Windows 98, Win2000, or any other operating system that supports direct 3D. The Windows operating system includes a standardized platform called Direct X for Windows.

In one embodiment, a user sets up the flat geometric surface (for example, a triangle mesh) in the Direct 3D windows environment. The set of instructions is then provided to the graphics pipeline, which finishes the rendering process. However, in another embodiment, the PC comprises a bypass mechanism that permits one to access the hardware accelerator directly using a software interface provided by the graphics card manufacturer.

FIG. 3 is a block diagram of a computer system 50 for performing a method in accordance with our invention. Referring to FIG. 3, system 50 comprises a CPU 52, e.g. a Pentium II class CPU, comprising a cache memory 52a, a core 52b and an internal bus 52c for facilitating communication between core 52b and cache 52a. Core 52b communicates via a CPU bus 54 to a system controller 56. System controller 56 communicates with the system memory 58 via a memory bus 60. System memory 58 includes a first portion 58a which stores system memory programs and a second portion 58b that stores the texture maps such as described above.

Also included in system 50 is a PCI bus 62 for facilitating communication between system controller 56 and I/O devices 64, 66 and disk drive 68. I/O device 64 can be any type of I/O device. In one embodiment, I/O device 66 is a video capture card with a driver. Data from the video capture card is either loaded by DMA (direct memory access) or CPU 52 into a frame buffer, typically within main memory 58. However, the frame buffer may be in other memories within system 50.

System 50 also includes an AGP graphics controller 70 comprising a 3D accelerator. In one embodiment, AGP graphics controller 70 communicates with system controller 56 via an AGP bus 72. In an alternative embodiment, AGP graphics controller 70 can communicate with system controller 56 via PCI bus 62 (e.g. as shown in phantom in FIG. 3).

Graphics controller 70 uses its own local memory 74 to generate and store pixel arrays to be displayed on a video display unit 76.

It is emphasized that system 50 is only one example of a system that performs a method in accordance with our invention. Other hardware can be used as well.

While the invention has been described with respect to specific embodiments, those skilled in the art will appreciate that changes can be made in form and detail without departing from the spirit and scope of the invention. For example, the image corresponding to the watermark can be part of a photograph or video image. Alternatively, the image corresponding to the watermark can simply be an alphanumeric character. The geometric surface to which the image is bound can be much more complex than what is shown in FIG. 4B. Accordingly, all such changes come within the present invention.

We claim:

1. A method comprising:
   providing first data depicting an image;
   providing a geometry to which said first data is bound, wherein said first data and geometry are embedded within second data;
   rendering an image based on said first data and said geometry in accordance with illumination from a first virtual light source; and
   rendering an image based on said first data and said geometry in accordance with illumination from a second virtual light source, wherein said rendering is performed as part of a process for determining the authenticity of said second data.

2. Method of claim 1 wherein said first data is a pixel or texel array.

3. Method of claim 1 wherein said rendering is performed using a 3D graphics pipeline.

4. Method of claim 1 wherein said second data is a piece of software, said method of claim 1 being performed as part of a process of determining the authenticity of said software.

5. Method of claim 1 wherein said second data corresponds to visual information, said method of claim 1 being performed as part of a process of determining the authenticity of said visual information.

6. A method comprising:
   providing first data depicting an image;
   providing a geometry to which said image is bound, wherein said first data and geometry are embedded within second data;
   rendering an image based on said first data and said geometry from the perspective of a first virtual viewer; and rendering an image based on said first data and said geometry from the perspective of a second virtual viewer, wherein said rendering is performed as part of a process for determining the authenticity of said second data.

7. Method of claim 6 wherein said first data is a pixel or texel array.

8. Method of claim 6 wherein said rendering is performed using a 3D graphics pipeline.

9. Method of claim 6 wherein said second data is a piece of software, said method of claim 6 being performed as part of a process of determining the authenticity of said software.

10. Method of claim 6 wherein said second data corresponds to visual information, said method of claim 6 being performed as part of a process of determining the authenticity of said visual information.

11. Method of claim 6 wherein said rendering of said image is accomplished using a predetermined virtual light source for image authentication.

12. A method for authenticating data values, said data values comprising values corresponding to the depiction of a first image and values corresponding to a geometry of a surface, said method comprising:

providing to a 3D graphics pipeline information corresponding to the location of a virtual light source, said values corresponding to the depiction of said first image, and said values corresponding to said geometry; and rendering a second image on a display, said second image corresponding to said first image bound to said geometry from the perspective of a virtual viewer, said rendered second image indicating whether said data values are authentic.

13. Method of claim 12 wherein said data values are a stream of data values.

14. Method of claim 13 wherein said stream of values comprises a piece of computer software.

15. Method of claim 13 wherein said stream of values comprises a video stream.

16. Method of claim 13 wherein said stream of values represent a visual depiction of an image.

17. A method for authenticating data values, said data values comprising values corresponding to the depiction of a first image and values corresponding to a geometry of a surface, said method comprising:

providing to a 3D graphics pipeline a virtual light source, said values corresponding to the depiction of said first image, and said values corresponding to said geometry; and rendering a second image on a display, said second image corresponding to said first image bound to said geometry as illuminated from a virtual light source, said rendered image indicating whether said data values are authentic.

18. Method of claim 17 wherein said data values are a stream of data values.

19. Method of claim 18 wherein said stream of values comprise a piece of computer software.

20. Method of claim 18 wherein said stream of values comprise a video stream.

21. Method of claim 18 wherein said stream of values represent a visual depiction of an image.

22. Apparatus comprising:

a memory storing information corresponding to a first image and a geometric surface, said first image and geometric surface comprising an electronic watermark;

a display device; and means for rendering an image on said display device using a virtual illumination source, whereby said rendered image indicates whether said electronic watermark is authentic.

23. Apparatus of claim 22 wherein information is part of a video data stream.

24. Apparatus of claim 22 wherein said information is part of a piece of software.

25. Apparatus of claim 22 wherein said information is part of a larger data collection.

26. Apparatus comprising:

a memory storing information corresponding to a first image and a geometric surface, said first image and geometric surface comprising an electronic watermark;

a display device; and means for rendering an image on said display device from the perspective of a virtual viewer, whereby said rendered image indicates whether said electronic watermark is authentic.

27. Apparatus of claim 26 wherein information is part of a video data stream.

28. Apparatus of claim 26 wherein said information is part of a piece of software.

29. Apparatus of claim 26 wherein said information is part of a larger data collection.

30. Apparatus comprising:

a memory storing information corresponding to a first image and a geometric surface, said first image and geometric surface comprising an electronic watermark;

a display device; and a graphics pipeline for rendering an image on said display device using a virtual illumination source, whereby said rendered image indicates whether said electronic watermark is authentic.

31. Apparatus comprising:

a memory storing information corresponding to a first image and a geometric surface, said first image and geometric surface comprising an electronic watermark;

a display device; and a graphics pipeline for rendering an image on said display device from the perspective of a virtual viewer, whereby said rendered image indicates whether said electronic watermark is authentic.

* * * * *